US012596487B2

(12) United States Patent
Elbaum

(10) Patent No.: US 12,596,487 B2
(45) Date of Patent: Apr. 7, 2026

(54) DEVICE AND SYSTEM FOR THE SECURE STORAGE OF DATA IN A DISTRIBUTED MANNER

(71) Applicant: NEW CLOUD DYNAMICS PTY LTD, Murrumbeena (AU)

(72) Inventor: Hector Elbaum, Murrumbeena (AU)

(73) Assignee: New Cloud Dynamics Pty Ltd., Murrumbeena (AU)

( * ) Notice: Subject to any disclaimer, the term of this patent is extended or adjusted under 35 U.S.C. 154(b) by 0 days.

(21) Appl. No.: 18/701,726

(22) PCT Filed: Oct. 19, 2022

(86) PCT No.: PCT/AU2022/051258
§ 371 (c)(1),
(2) Date: Apr. 16, 2024

(87) PCT Pub. No.: WO2023/064986
PCT Pub. Date: Apr. 27, 2023

(65) Prior Publication Data
US 2025/0231695 A1 Jul. 17, 2025

(30) Foreign Application Priority Data

Oct. 19, 2021 (AU) ................................. 2021254561
Oct. 20, 2021 (WO) ................ PCT/AU2021/051222

(51) Int. Cl.
*G06F 3/06* (2006.01)

(52) U.S. Cl.
CPC .......... *G06F 3/0622* (2013.01); *G06F 3/0655* (2013.01); *G06F 3/067* (2013.01)

(58) Field of Classification Search
CPC ....... G06F 3/067; G06F 3/0622; G06F 3/0655
See application file for complete search history.

(56) References Cited

U.S. PATENT DOCUMENTS

2010/0162003 A1* 6/2010 Dodgson ................. G06F 3/064
713/193
2016/0156469 A1 6/2016 Takahashi
(Continued)

FOREIGN PATENT DOCUMENTS

CN 103959302 A * 7/2014 ......... G06F 21/6227
WO WO-2010057194 A2 * 5/2010 ............... H04L 9/14

OTHER PUBLICATIONS

Search Report & Written Opinion issued in PCT/AU2022/051258. (Jan. 26, 2023).
(Continued)

*Primary Examiner* — Jonathan A Bui
(74) *Attorney, Agent, or Firm* — Barnes & Thornburg

(57) ABSTRACT

A network of storage devices for encrypting and storing data is provided. A first storage device of the network comprises: a mechanism or system for authenticating a user via user interaction directly with the first storage device, a mechanism for connecting over a local connection with one or more user devices, and computer-readable memory for storing electronic data on the first storage device. The first storage device is configured to receive, over the local connection and from a first of the one or more user devices, first data for storage at the first storage device, to encrypt the first data and store the encrypted first data locally in the computer-readable memory of the first storage device; to split the encrypted first data into multiple portions; to apply a cryptographic signature to each of plural groups of one or more of the portions, the cryptographic signature enabling the first storage device to be identified and authenticated by other storage devices of a network of storage devices, to send each of the cryptographically signed groups to a respective other storage device of the network of storage (Continued)

devices, and to create a first record which associates the first data with the other storage devices of the network to which the cryptographically signed groups of were sent. The first storage device is further configured to, responsive to a request to access the first data, the request to access the first data resulting from a user request to access the first data provided to a user device and received at the first storage device via a local connection with the user device, retrieve the encrypted first data from the computer-readable memory, decrypt the encrypted first data, and send, over the local connection with the user device to which the user request to access the first data was provided, the decrypted first data. The first storage device is further is configured to: receive a request for transmission of previously-received, cryptographically signed second data, authenticate the request for the transmission of the previously-received, cryptographically signed second data as having originated from another storage device of the network of storage devices, and having authenticated the request for the transmission of the previously-received, cryptographically signed second data as having originated from another storage device of the network of storage devices, send the previously-received, cryptographically signed second data to the other storage device of the network of storage devices.

19 Claims, 4 Drawing Sheets

(56) References Cited

U.S. PATENT DOCUMENTS

| | | | | |
|---|---|---|---|---|
| 2016/0180102 A1* | 6/2016 | Kim | .................... | G06F 12/1408 |
| | | | | 713/164 |
| 2016/0323103 A1 | 11/2016 | Baptist et al. | | |
| 2017/0005788 A1* | 1/2017 | Irvine | ................. | H04L 63/0428 |
| 2017/0272209 A1* | 9/2017 | Yanovsky | ............... | G06F 3/065 |
| 2018/0315044 A1 | 11/2018 | Schukai et al. | | |
| 2020/0363994 A1 | 11/2020 | Jing | | |
| 2020/0401718 A1 | 12/2020 | Hennig et al. | | |

OTHER PUBLICATIONS

Examination Report dated Jun. 5, 2025, related Australian Application No. 2022370371, 3 pages.
Communication dated Aug. 6, 2025, related European Application No. 22882105.4, 10 pages.

* cited by examiner

DEVICE AND SYSTEM FOR THE SECURE STORAGE OF DATA IN A DISTRIBUTED MANNER

CROSS-REFERENCE TO RELATED APPLICATIONS

This application is a United States National Stage Application under Section 371 of PCT Application No. PCT/AU2022/051258, filed on Oct. 19, 2022, which claims priority from Australian Application No. 2021254561, filed on Oct. 19, 2021, and International Application No. PCT/AU2021/051222, filed Oct. 20, 2021; the entirety of which are each hereby fully incorporated by reference herein.

FIELD OF THE DISCLOSURE

This disclosure relates to the field of distributed data storage, more specifically to a storage device and method of making a distributed data storage network by interconnecting storage devices that store data in a highly secure manner with other similar storage devices.

BACKGROUND

The storage of data "online" (also sometimes referred to as "in the cloud") is both highly prevalent in industrialised countries and growing very quickly throughout the world. This manner of storage confers, amongst other things, the advantages of being able to access the same data in multiple locations and being able to retrieve that data if a particular device holding it is lost or destroyed. This manner of storage ordinarily involves users uploading their data to online storage providers.

This may be done, for example, by the user installing an application on their computer or smart phone. This application will then take data from a specific location or locations on the user's device and upload it to "the cloud", making it available to the user on other devices that the user controls. Alternatively, such an application, or its functional equivalent, may come pre-installed on the device when the user acquires it, or form part of the operating system of the device.

Such systems are sometimes restricted to storing particular types of data. For example, a cloud storage system may allow the storage and retrieval only of photographic or video files. Other such systems may allow users to store any arbitrary electronic data. For example, some such systems allow a user to store any type of electronically readable file, including data such as word processing documents, spreadsheets, databases, application files, and source code repositories. Some such systems may restrict usage in particular ways; for example, by total amount of data stored at any given point in time or by total amount of data transmitted over any given period.

In all cases, sensitive personal or commercial data may be included among the data. In general, it is entirely up to a user whether to include sensitive data in the data stored in this manner.

The use of vague terminology such as "online" or "in the cloud" masks the true nature of the storage location. In fact, the data is stored in at least one, and often multiple, physical electronic storage devices (such as hard disks). These storage devices are generally located in data centres with a highly available internet connection. The storage devices may be owned by a variety of persons. For example, they may be owned by the owner of the data centre; by the storage service provider; by a third party that owns hardware in the data centre and sells access to its storage to the service provider; or by another party that has any number of possible commercial arrangements with any of the parties named above.

One of the few certainties in such an arrangement is that the user will not, except in extraordinary circumstances, own or control the equipment on which their data is stored.

The user's data may be stored on storage devices in one such data centre or multiple copies of it may be stored in multiple such data centres. This would usually be done for the sake of redundancy (e.g. if one data centre is destroyed and all its data lost, copies will be available from other data centres), for the sake of high availability (e.g. to ensure that if one data centre is temporarily offline, the user can retrieve their data from another data centre) or for a combination of both reasons.

If the data is stored in multiple data centres, these may be in a variety of potential locations. For example, they may all be within a particular geographic region (e.g. Western Europe); they may all be within a particular political unit (e.g. within a single nation state, such as Australia, or within a union of nations, such as the European Union); or they may be distributed all over the world. Depending on the precise service being used and the sophistication level of the user, the user may not (and often will not) know even the general region where their data is stored or how many copies of the data are stored.

As a result of the above, the user must implicitly trust in their online storage provider with the security of their data. In the first place, they must trust that the provider will not voluntarily disclose that data or use it in some unauthorised, unethical or even illegal manner (for example, withhold it from the user subject to payment of a ransom). Further, the user must also trust that the online storage provider has sufficient security to prevent malicious third parties from accessing the data and using it in such a manner. This trust can be difficult to establish given the complicated structure of the storage systems, the multiple ways in which the underlying storage may be owned and controlled and the multiple locations in which it may be placed.

For certain users this presents a barrier to the usage of online storage. This would include certain users who are prohibited from using such online storage services due to the policies, regulations or laws that govern their data storage. Such policies, regulations, and laws have sometimes been implemented due to known limitations concerning the security of such systems. For example, certain governmental organisations may be unable to use such services to store information which is classified at or above specified data security classification levels (e.g. "sensitive", "secret" etc).

Other users, such as private users or businesses, may simply not trust online storage providers with their sensitive or private data. This may be due to one of the issues outlined above, or for other reasons.

The above description of potential users is not intended to be limiting, but is merely to highlight the existence of persons who may not want to rely on existing cloud storage infrastructure. Whatever their reason for being unable to use existing cloud storage systems, or for choosing not to do so, such users may still want to benefit from the advantages of using cloud storage named above (for example, being able to retrieve their data if the device holding it is destroyed). Such users would benefit from a system providing a greater degree of security and data sovereignty.

It is an object of the present invention to mitigate at least some of these problems and to provide such users with a method of storing their data which provides the advantages of cloud storage while addressing its security shortcomings.

SUMMARY

The technology to which this specification relates utilises a network of similar secure storage devices to securely store user data, without making use of cloud storage. Together the network of secure storage devices allow data to be securely stored and retrieved by an authenticated user of the network of secure storage devices, even if the user's secure storage device is lost or destroyed. As will be become clear, the network of storage devices described herein may, in effect, form a physical private network over a public or open network such as the Internet.

Each secure storage device of the network may include an authentication mechanism (which may include e.g. a key pad, a face scanner, or a finger print scanner) for authenticating a user of the device via direct interaction with the secure storage device. However, the secure storage devices may be configured such that users interact with their secure storage device to store and retrieve data via interaction with a user device (such as a personal computer, tablet or smartphone) that has a local connection (e.g. a wired connection or a local wireless connection) with the secure storage device. For instance, a user may submit a request, via their user device, to store or retrieve data. The secure storage device may respond to such requests by requiring the user to authenticate themselves via direct interaction with the authentication mechanism of the secure storage device. Only after successful authentication may the secure storage device perform the operations required to fulfil the user's request.

The secure storage devices of the network may communicate with one another to distribute and retrieve data. Some or all of the communications between storage devices may be signed with a cryptographic signature associated with the device. This allows the secure storages devices of the network to communicate and store data in a secure manner.

In a first aspect, this specification describes a first storage device for encrypting and storing data. The first storage device comprises a mechanism or system for authenticating a user via user interaction directly with the first storage device, a mechanism for connecting over a local connection with one or more user devices, and computer-readable memory for storing electronic data on the first storage device. The first storage device is configured to receive, over the local connection and from a first of the one or more user devices, first data for storage at the first storage device, to encrypt the first data and store the encrypted first data locally in the computer-readable memory of the first storage device; to split the encrypted first data into multiple portions; to apply a cryptographic signature to each of plural groups of one or more of the portions, the cryptographic signature enabling the first storage device to be identified and authenticated by other storage devices of a network of storage devices, to send each of the cryptographically signed groups to a respective other storage device of the network of storage devices, and to create a first record which associates the first data with the other storage devices of the network to which the cryptographically signed groups of were sent. The first storage device is further configured to, responsive to a request to access the first data, the request to access the first data resulting from a user request to access the first data provided to a user device and received at the first storage device via a local connection with the user device, retrieve the encrypted first data from the computer-readable memory, decrypt the encrypted first data, and send, over the local connection with the user device to which the user request to access the first data was provided, the decrypted first data. The first storage device is further is configured to: receive a request for transmission of previously-received, cryptographically signed second data, authenticate the request for the transmission of the previously-received, cryptographically signed second data as having originated from another storage device of the network of storage devices, and having authenticated the request for the transmission of the previously-received, cryptographically signed second data as having originated from another storage device of the network of storage devices, send the previously-received, cryptographically signed second data to the other storage device of the network of storage devices.

The storage device may be further configured to, respond to receipt of a request to access third data, the request to access the third data resulting from a user request to access the third data provided to a user device and received at the first storage device via a local connection with the user device, by: determining that the third data is not retrievable from the first storage device; accessing a second record which associates the third data with other storage devices of the network to which one or more portions of the third data were previously sent; generating a respective request to be sent to plural ones of the other storage devices identified in the second record, each of the requests being for requesting that the one or more portions of the third data, that were previously sent to the storage device for which the request is intended, be transmitted to the first storage device, signing each request with the cryptographic signature of the first storage device to identify the first storage device and verify the authenticity of the request; and sending the cryptographically signed requests to the plural ones of the other storage devices. The first storage device may be further configured to: receive plural groups of one or more portions of the third data from the plural ones of the other storage devices; arrange the data of the plural groups of one or more portions of the third data and decrypt the arranged data to reproduce the third data; and transfer, to the user device to which the user request to access the third data was provided and via the local connection with the user device to which the user request to access the third data was provided, the reproduced third data. Determining that the third data is not retrievable from the first storage device may comprise determining that a copy of the third data previously-stored locally on the first storage device is corrupted. Alternatively, the third data may never have been locally stored on the first storage device.

The request for transmission of previously-received, cryptographically signed second data may be authenticated using a cryptographic signature received with the request for the transmission of a previously-received, cryptographically signed second data.

The first storage device may be configured to communicate with the other storage devices of the network via a combination of a local connection with a currently connected user device and a connection of the currently connected user device with a communications network. The communications network may be a public or open network between devices with encrypted communications, such as the Internet.

The first storage device may be a portable storage device.

The mechanism for authenticating a user via user interaction directly with the first storage device may comprise a group of buttons or other mechanical, electronic or electromagnetic switches permitting user input.

The mechanism for authenticating a user via user interaction directly with the first storage device may comprise a biometric reader.

The first storage device may be configured to encrypt the first data and store the encrypted first data locally in the computer-readable memory of the first storage device responsive to a successful authentication of the user via user interaction directly with the first storage device.

The first storage device may configured to retrieve the encrypted first data from the computer-readable memory, decrypt the encrypted first data, and send the decrypted first data over the local connection responsive to a successful authentication of the user via user interaction directly with the first storage device.

The first storage device may be configured to send the cryptographically signed requests to the plural ones of the other storage devices responsive to a successful authentication of the user via user interaction directly with the first storage device.

The first storage device may configured so as not to respond to any user-derived requests unless the user has been successful authenticated via user interaction directly with the first storage device.

The first storage device may further comprise an anti-tamper system to detect physical or electrical tampering with the device and to respond by rendering cryptographic keys, which are stored at the first storage device and are for use in decrypting data also stored on the first storage device, unusable.

Each of the storage devices of the network of storage devices may be of a same type as the first storage device. Each of the storage devices of the network of storage devices may be a portable storage device. Each of the storage devices of the network of storage devices may comprise a mechanism or system for authenticating a user via user interaction directly with the storage device, a mechanism for connecting over a local connection with one or more user devices, computer-readable memory for storing electronic data on the storage device, and at least one processor configured to encrypt data prior to storage and/or transmission.

The first storage device may further comprise a display for presenting information to the user.

In a second aspect, this specification describes a system comprising at least two storage devices configured as described with reference to the first storage device of the first aspect. In addition, the system may comprise a database which includes records indicating the secure storage devices amongst which stored data has been distributed. Records may be retrieved from the database, for instance, in the event that a storage device is lost or damaged and a user needs to retrieve their data using the a new storage device.

BRIEF DESCRIPTION OF THE DRAWINGS

For better understanding of the present application, reference will now be made by way of example to the accompanying drawings in which.

DETAILED DESCRIPTION OF THE EMBODIMENTS

Figure 1:
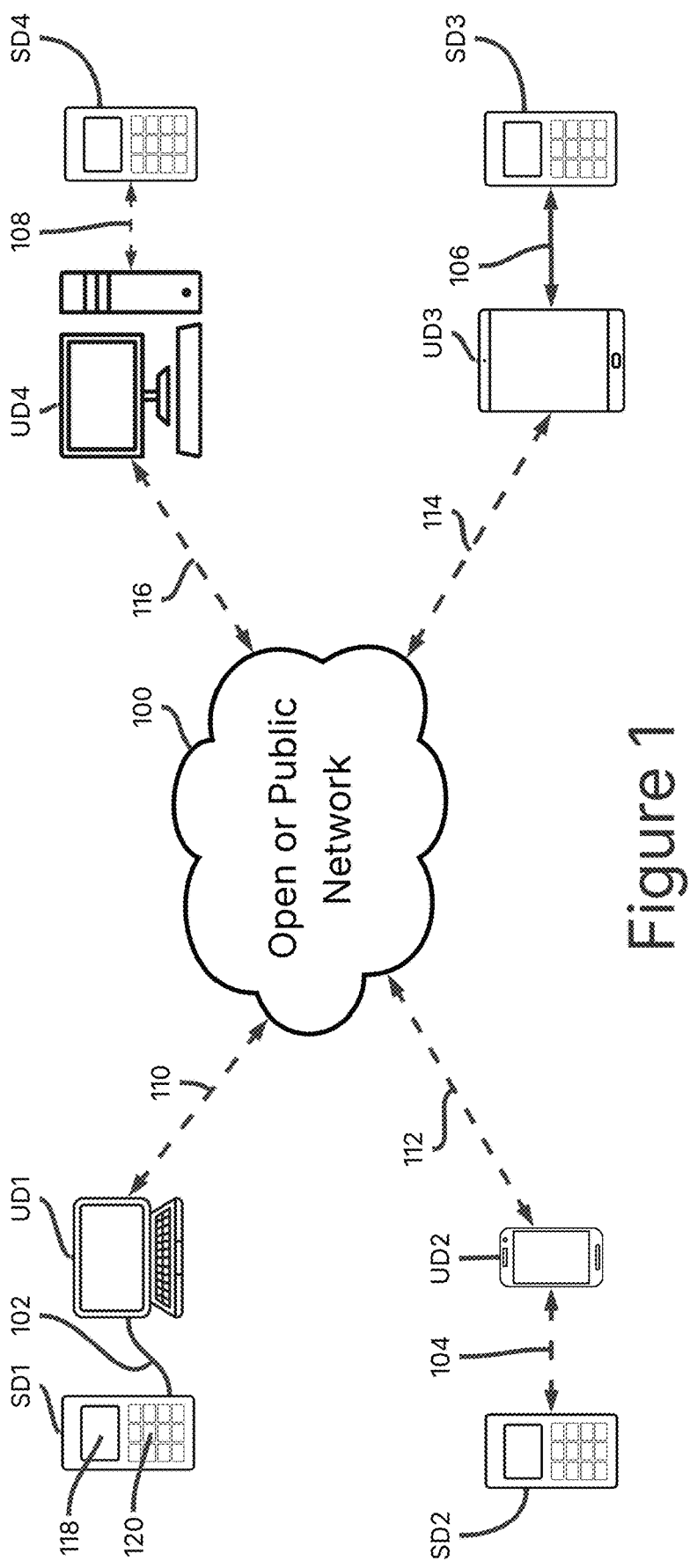
FIG. 1 illustrates a network of secure storage devices.
Figure 4:
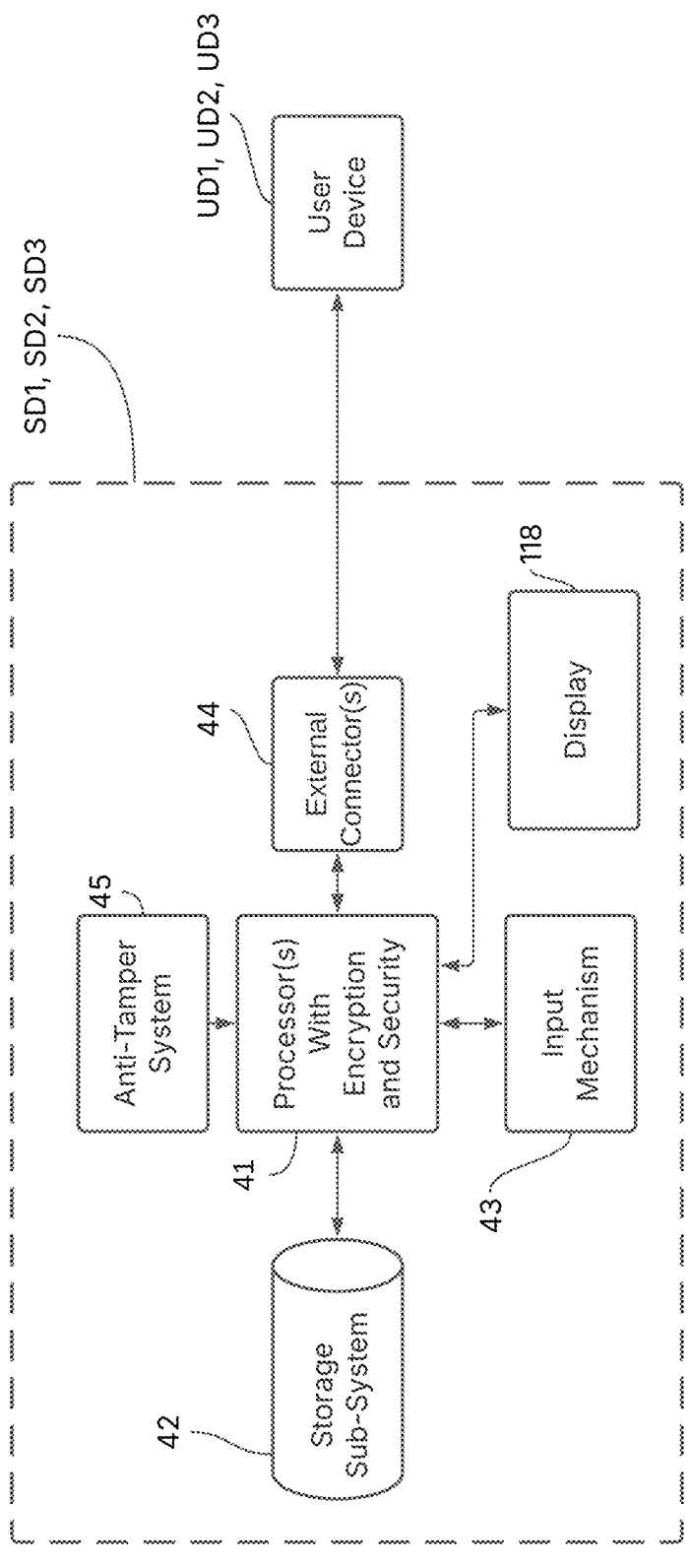
FIG. 4 is an example of various components that may be included in the storage devices of the network of storage devices.

In the description and drawings below, like reference numerals refer to like elements throughout.
Example Network of Storage Devices FIG. 1 is a schematic illustration of a network of secure storage devices. In the illustrated example, first to fourth secure storage devices SD1, SD2, SD3, SD4 are shown. However, it will be appreciated that the network may include only three secure storage devices, or may include more than four secure storage devices. FIG. 4, which will also be discussed with reference to FIG. 1, illustrates various components which may be included in the storage devices of the network storage devices.

In the example of FIG. 1, each of the secure storage devices SD1, SD2, SD3, SD4 is communicatively coupled with a respective user device UD1, UD2, UD3, UD4. The user devices may be of any suitable type and may include, for instance, laptop computers UD1, desktop computers UD4, and handheld devices such as smartphones UD2 and tablets UD3. Different secure storage devices within the network may be used with different types of user device.

The storage devices are not located in the cloud but may instead be located locally to their users and associated user devices. The storage devices may be portable storage devices. Indeed, in some examples, the portable storage devices may be referred to as "pocket-sized". Each of the secure storage devices SD1, SD2, SD3, SD4 is communicatively coupled with its respective user device via a local connection 102, 104, 106, 108. The local connections, which may be referred to as short range connections, may include, for instance, wired connections 102, 106 or wireless connections 104, 114. The local connections may be direct wireless connections between the user device and the secure storage device, such as but not limited to Bluetooth, Zigbee, Wi-Fi direct, and optical connections. Alternatively, the local connections may be indirect wireless connections such as via an access point of a WLAN. Different storage devices of the network may communicate with their respective user devices over different types of local connection. In some examples, the storage devices of the network may be capable of connecting with a user device via more than one type of local connection. For instance, the storage devices may have means for forming a short range wireless connection (e.g., Bluetooth) as well as a connector for a wired connection with the user device. Accordingly, as can be seen in FIG. 4, the storage devices may include one or more external connectors 44, via which the local connection with the user device may be formed In the example of FIG. 1, each of the storage devices SD1, SD2, SD3, SD4 is configured to communicate with each of the other storage devices via their associated user device UD1, UD2, UD3, UD4. In such examples, the user devices include networking capability, such as a modem or other device, which enables the user device to establish a connection 110, 112, 114, 116 with public (or open) data networks 100 (e.g. the Internet). The storage devices may therefore make use of the networking capability of their associated user device to communicate with the other storage devices in the network. In some examples, however, one or more of the storage devices may include its own networking capability and so may communicate with the other storage devices without making use of the networking capability of its associated user device.

As can be seen in FIG. 4, the storage devices include at least one processor 41. The at least one processor is capable of performing cryptographic functionality. For instance, the at least one processor may comprise a microcontroller with integrated cryptographic functionality. This microcontroller may be capable of performing all processing operations required of the storage devices. In other examples, the storage device may include a dedicated cryptographic processor communication with another processing devices, such as a processor or microcontroller.

The data storage devices additionally include a data storage sub-system 42 including one or more computer-readable memory media. The computer-readable memory media of the storage subsystem may, for instance, include but are not limited to one or more hard disk drive (HDD) and/or solid state drive (SSD).

Data received from the user device locally connected with the storage device can be stored using computer readable memory media, as can data received from other storage devices of the network storage devices. A part of the memory of the storage sub-system may be allocated or reserved for storage of data received from other storage devices of the network storage devices. Another part of the memory of the storage system may be used for storing data for its user, which may be received from the user device over the local connection.

The computer readable memory media may also be used to store one or more private cryptographic keys for use in encrypting data. A unique identifier, which uniquely identifies the storage device can also be stored in the computer readable memory media. This unique identifier may be used to identify the storage device to other storage devices of the network of storage devices. The unique identifier may be the public key of the storage device.

As illustrated in FIG. 1, each of the storage devices SD1, SD2, SD3, SD4 also includes, contains or is directly connected to an authentication mechanism 120. The authentication mechanism 120 is configured to allow the storage device to authenticate a user of the storage device via a direct interaction with the storage device. The authentication mechanism 120 may include an input mechanism, such as a keypad or a keyboard, for enabling a user to enter information responsive to a security challenge. Other examples include biometric authentication mechanisms such as fingerprint scanners, facial recognition systems and/or retinal scanners. In some examples, the storage devices may include more than one different type of authentication mechanism, e.g. a keypad and a biometric authentication mechanism.

In FIG. 4, the input mechanism is illustrated by the reference numeral 43. It will be appreciated that the authentication mechanism may be provided by a combination of the input mechanism, via which identifying information can be provided to the device, and the at least one processor 41, which processes the identifying information to authenticate (or otherwise) the user.

The storage devices of the network may also include a display 118 for displaying information to the user. The display may be integrated into the storage device. The display may be used for prompting the user to authenticate themselves to the storage device via the authentication mechanism. The display may also or alternatively be used to indicate an error (e.g. unsuccessful authentication) or a confirmation (e.g. successful authentication). In other examples, such prompts or other information may be communicated to the user via an output mechanism (e.g. but not limited to a display) of the user device, or may be indicators via some other mechanism on the storage device (e.g., illuminating an LED, outputting a vibration, or playing an audible tone). In some examples, the display may additionally be used for displaying data that is retrieved from the storage device.

The storage devices may also be physically secure or "tamper proof". For instance, they may include a physical security system 45 (which may be termed an "anti-tamper system") that is configured to detect any attempt to infiltrate the storage device. Such attempts may include attempts to physically tamper with the device by opening it or probing it using electronic means. Upon detecting such an attempt, the anti-tamper system 45 may cause the storage device to protect any data stored in the storage subsystem of the storage device.

The anti-tamper system 45 may comprise a physical barrier between the user accessible part of the storage device (for example, its exterior and any integrated input or output mechanism) and the internal components including at least the encryption-capable processor and the storage sub-system (or parts thereof) storing the cryptographic keys. In some examples, the physical barrier may consist of a metal mesh or other electrically conductive device which detects any opening of the storage device or any probing of it using electronic means. The anti-tamper system may be configured to, upon detection of such a tamper attempt, destroy all sensitive data on the secure storage device, including the cryptographic keys. As will be appreciated, the anti-tamper system 45 may be formed of a physical component for detecting a tamper event and a computational component (e.g. provided by the processor(s)) for responding to the tamper event, e.g. by destroying sensitive data.

Although not illustrated, the storage devices may include a power unit such as in the form of one or more batteries. In addition, or alternatively, the storage devices may be connectable to receive power from an external entity such as the mains power or the user device.

The storage devices of the network of storage devices are said to be of the "same type". Whilst the storage devices may be identical to one another, in some examples the storage devices may not need to be identical to be of the "same type". In some examples, storage devices of the "same type" may be storage devices of the same make and series, but may be allowed to be a different model and/or version. In some examples, it may be sufficient that the devices have the same capabilities as regards encryption, storage and transmission of data. In some examples, to be of "the same type" and so be allowed to participate in the network, the storage devices must meet a set of minimum hardware and software requirements. Such minimum requirements may include the ability to encrypt data with at least a minimum degree of security, the ability to transmit encrypted data to other storage devices of the network, and the ability to identify and authenticate themselves to other storage devices of the network. In addition, the storage devices may each be required to have an anti-tamper system of a minimum standard. The storage devices may additionally be required to have the ability to authenticate the user at the storage device.

Each of the storage devices in the network may store a list of the other trusted storage devices, which includes connection information (e.g. IP addresses) and unique identifiers, which may be in the form of public keys. The list may be automatically shared between storage devices in the network when the devices join the network.

To initially join a network of storage devices, an invitation may be issued which includes network's public key and at least one IP address of one of the storage devices in the network.

Example Implementations

In one example implementation, the storage devices may be provided to a particular group of users (e.g. employees of a government agency with a certain level of clearance). The storage devices provided to the group of users may thus form the network of storage devices. Each one of the group of users may also be given a mechanism (including software and/or hardware) to enable them to connect the storage device to their user device (e.g. their personal computer). The group of users may be required to store any data of a particular level of sensitivity on their storage device. When the storage devices are connected to their associated user devices, data may be transferred between the storage devices of the network. In some examples, the group of users may be required to connect their storage devices to their user devices at certain pre-agreed times and/or with a particular periodicity.

An administrator of the network may determine an allocation of memory on each storage device for the storage of data by the user and for the storage of data coming from storage devices of other users. Alternatively, the allocation of memory may be pre-defined. The allocation for each storage device may be the same or different storage devices may have different allocations. As an example, if data redundancy and distribution was of high importance, allocation may be 25% for the user and 75% for data coming from other storage devices. This may have the effect that (assuming enough users are online at any given time) every user could have their data duplicated at least once—and probably more than once—across the network of storage devices.

In such implementations, each storage device in the (private) network of storage devices would only allow its data to be shared with a known list of other storage devices in the network, which may have been authorised by the network's administrator. It will be appreciated, however, that there are other implementations in which storage devices can be used by a group of user who are not necessarily known to each other or connected by any common characteristic.

Example Methods Involving the Network of Storage Devices

Figure 2:
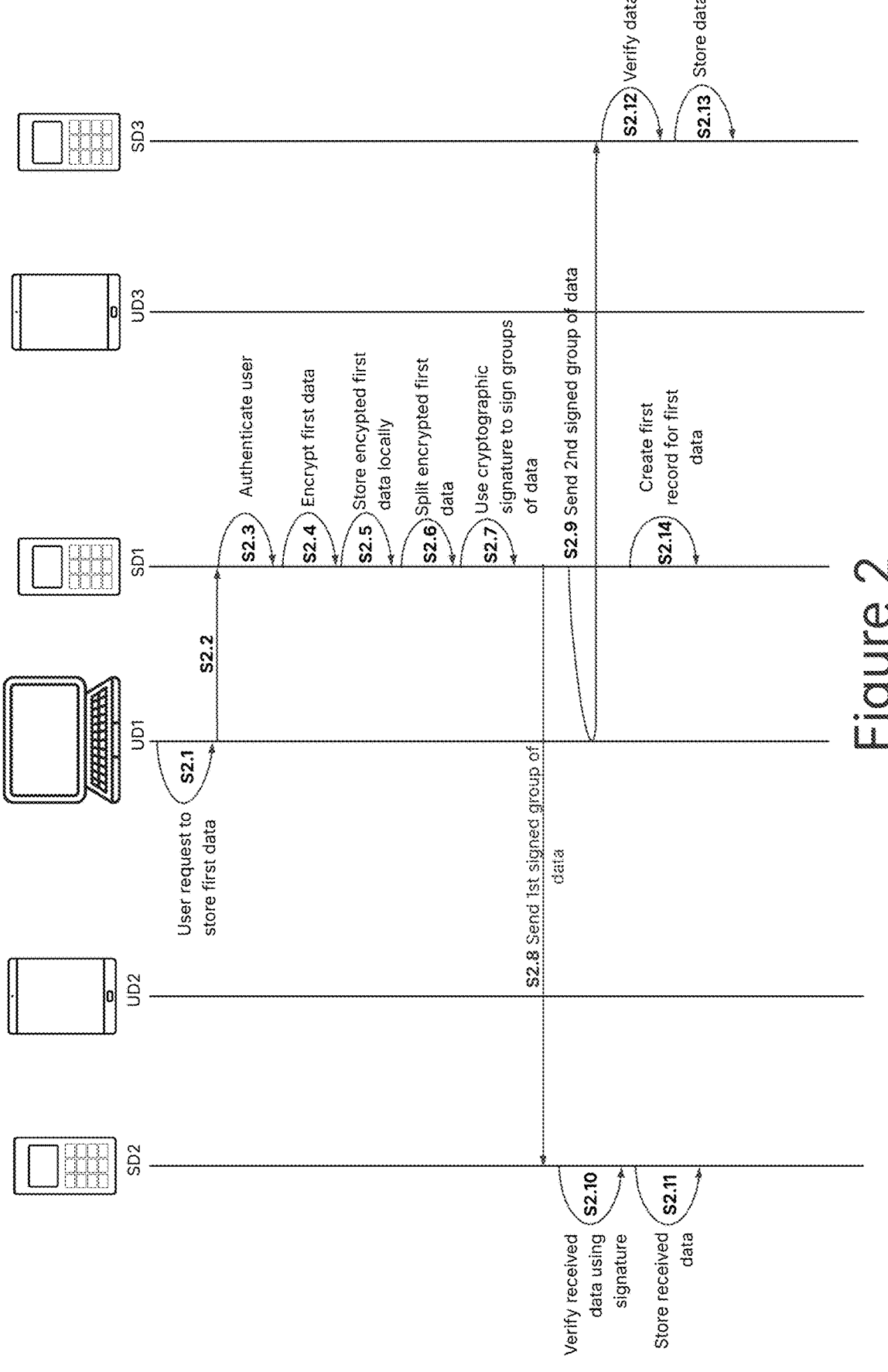
FIGS. 2 and 3 illustrate various operations that may be performed by secure storage devices of a network of storage devices.
Figure 3:
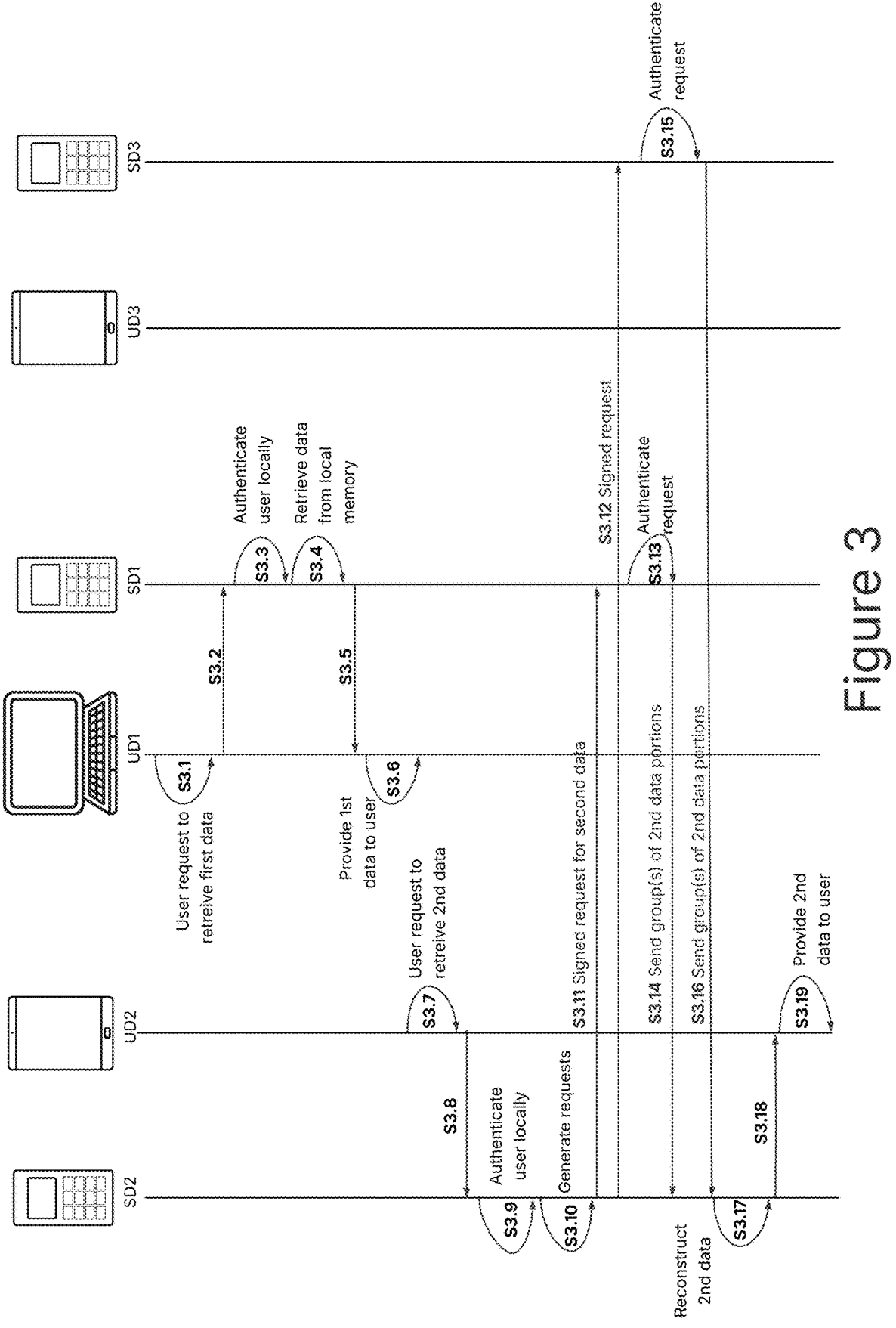

FIGS. 2 and 3 illustrate various operations that may be performed by secure storage devices of a network of storage devices. For ease of illustration, FIGS. 2 and 3 depict only three storage devices SD1, SD2, SD3. However, as noted above, the network of storage devices may include more than three storage devices.

FIG. 2 relates primarily to operations associated with storing and distributing data within the network storage devices.

In operation S2.1, a user request is received at a first user device UD1. The user request is a request for first data (e.g. a file or collection of files) to be stored on a first storage device SD1, which is associated with the user, and/or their user device. For instance, the user may be interacting with a file via the first user device UD1 and may provide an input for causing the file to be "saved" using the network of storage devices.

In operation S2.2, an indication of this request is provided from the first user device UD1 to the first storage device SD1 over a local connection.

In operation S2.3, responsive to this indication, the first storage device may perform operations for authenticating the user. Such operations may include prompting the user to authenticate themselves using the authentication mechanism of the storage device SD1. The prompt may, for instance, be provided via a display or other output means of the storage device, or may be provided via the first user device UD1. Regardless of whether and how such a prompt is provided, the user may authenticate themselves to the first storage device SD1 using the authentication mechanism. In other examples, the user may authenticate themselves to first storage device SD1, via the first user device UD1. For instance, a pin or password may be provided by input means of the first user device UD1 and may then be forwarded to, and verified by, the first storage device SD1.

In operation S2.4, following successful authentication of the user, the first storage device storage device encrypts the first data. The first data may be provided from the first user device to the first storage device with the indication of S2.2, or may be provided from the first user device to the first storage device after successful authentication. For instance, the first storage device may provide an indication of the successful authentication to the first user device, which may respond by transferring the first data to the first storage device.

The encryption is performed a cryptoprocessor of the storage device or the cryptographic functionality of a microcontroller of the storage device. The encryption may be performed using a private key stored in the storage subsystem of the storage device. By using a cryptoprocessor or cryptographic functionality of a microcontroller, the data received at the storage device can be encrypted in a highly secure manner. The strength of the encryption may be such that, even if the secured data is intercepted when being communicated to remote devices, it is impractical for any person or organisation to decrypt the data within a period of time that would make the undertaking fruitful. In addition, use of the cryptoprocessor or cryptographic functionality of a microcontroller may allow the encryption to be performed quickly, for instance quickly enough that, in most situations, a user will not be aware of any extra time taken to encrypt the data (when compared to other transfers of data to other devices using similar storage and transfer technology).

In operation S2.5, the first storage device stores the encrypted first data (or a copy thereof) locally in the data storage subsystem of the first storage device SD1.

In operation S2.6, the encrypted first data (or a copy thereof) is split or divided, by the first storage device, into multiple portions. The portions into which the encrypted first data is split may be of any suitable size, and may be pre-determined or determined algorithmically.

In operation S2.7, the first storage device applies a cryptographic signature to each of plural groups of one or more of the portions. In some examples, a signature may be applied to each portion, whereas, in other examples, groups of multiple portions may be formed and each of those groups may be cryptographically signed using the unique identifier of the device. The cryptographic signature is configured to enable the first storage device to be identified and authenticated by other storage devices of a network of storage devices.

The number of portions into which the first data is split may for instance be dependent on the size of the first data. For instance, there may be a predefined portion size, such that larger amounts of data are split into a larger number of portions. Alternatively, the number portions may be dependent on a number of other storage devices, amongst which the first data is to be distributed. In other examples, the number of groups of portions may be dependent on the number of other storage devices which the first data is to be distributed. In such examples, the portions may be of a fixed size. In other examples, the number of other storage devices, amongst which the first data is to be distributed may be dependent on the size of data. For instance, when the output data is larger, the data may be distributed amongst a larger number of other storage devices of the network.

In operations S2.8 and S2.9, the cryptographically signed groups of one or more portions of the encrypted first data are sent to other storage devices of the network of storage devices. Put another way, plural different storage devices of the network may each receive one or more of the cryptographically signed groups from the first storage device. As will be appreciated, the first storage device does not transmit all the groups of data portions derived from the first data to any one storage device. Instead, the groups are sent to multiple different storage device. In this way, the first data could not be replicated anywhere except the first storage device SD1 or by retrieval from all recipient storage devices in aggregate. In addition, the first storage device may transmit at least two copies of each group of one or more data portions derived from the first data, with each copy being sent to a different recipient storage device. In this way, retrieval may be possible, even if some of the recipient storage devices are not currently available.

As will be appreciated, each storage device of the network will only transfer data to other storage devices which it can verify as genuine, using their own unique identifier.

In some examples, the storage devices of the network to which the cryptographically signed groups are sent may be dependent on which storage devices of the network are currently communicatively coupled to the network (e.g. connected via a local connection with their user device, which is also connected to the wider network such as the Internet). For instance, only storage devices which are currently communicatively coupled to the network may be selected to receive one or more of the cryptographically signed groups. In some examples, if a required number of other storage devices (which may, for instance, be predetermined or dependent on the size first data) are not currently communicatively coupled to the network, the first storage device may distribute cryptographically signed groups of data portions to those storage devices that are currently communicatively coupled to the network, and may hold cryptographically signed groups of data portions for later distribution to other storage devices, as they become communicatively coupled to the network.

In some examples, data for storage may be sent to storage devices that are not currently communicatively coupled to the network. In such examples, an application running on the user device associated with the storage device that is not online may notify the user regarding an incoming communication (the user device may be unable to determine the nature of the communication) and/or prompt the user of to connect the storage device to the user device. Once the storage device is connected via the local connection, the user device forwards the data for storage to the storage device. In other examples, the user device may not notify the user but instead may store the incoming encrypted data at the user device until such time as the storage device is connected over the local connection.

It will of course be appreciated that selection of the other devices amongst which to distribute the data may be performed in any suitable manner. Various factors may be taken into account, in addition or alternatively to those described above. For instance, there may be a predetermined allocation schedule, which may dictate in some way where data should be sent. Another factor which may be considered may be available storage space at the recipient devices. For instance, if the first storage device attempts to send data to another storage device which does not have sufficient capacity, the other storage device may indicate this to the first storage device, which may then select an alternative storage device to which to send the data.

In the illustrated example of FIG. 2, a first cryptographically signed group of data portion(s) is sent from the first storage device SD1 to the second storage device SD2 in operation S2.8. A second cryptographically signed group of data portions is sent from the first storage device SD1 to the third storage device SD3 in operation S2.9.

More specifically, the first storage device SD1 sends the (cryptographically signed and encrypted) data to the first user device to which it is locally connected with instructions to on-send that data to intended recipient storage devices. The first user device does this using its connection mechanism with the wider network e.g. the Internet. As noted above, each storage device stores data (e.g. in a list) identifying each of the other devices in the secure network, to which it is permitted to send data. The data/list may be created and distributed to the devices when the network of devices is first configured. The data/list may include addresses for use in transmitting data to the devices. The data/list may be updated when additional storage devices register with the network.

Given the nature and strength of the encryption used by storage devices of the network, the user devices (in this case, the first user device) are unable to decode any data sent through them. An exception to this may be any information prepended to the encrypted data and instructing the intermediate device on how to deal with the data. Such information may be referred to as a "header" and may identify an address that is usable for sending the data to the recipient storage device. As a result, the user devices may effectively act as conduits between the storage devices.

In operation S2.14, the first storage device SD1 may create a storage record for the first data. This first record associates the first data with the other storage devices of the network to which the cryptographically signed groups of data portion(s) were sent. In some examples, it may identify which cryptographically signed groups of data portion(s) were sent to which other storage devices. This storage record for the first data may be stored locally at the first device. It may also be stored in a central repository and/or may be sent for storage at other storage devices of the network.

In operation S2.10, the second storage device SD2 verifies the received data as coming from a trusted storage device using the cryptographic signature. Prior to this, the second storage device SD2 has received the data via the second user device UD1, with which the second storage device is locally connected. Again, given the encryption of the data being transferred, the second user device is unable to decipher the data (except for the header) and thereby effectively acts as a conduit between the storage devices, in this case, the first and second storage devices.

In operation S2.11, having successfully verified the origin of the received data as a trusted storage device of the network, the second storage device SD2 stores the data in its own memory subsystem.

Similarly to operation S2.10 and S2.11, in operations S2.12 and 2.13, the third storage device SD3 verifies and stores the data received in operation S2.9.

Although not illustrated in FIG. 2, it will be appreciated that the first storage device is configured similarly to the second and third storage devices, thereby to receive, verify and store data originating from other storage devices of the network.

FIG. 3 illustrates operations of the network of storage devices relating primarily to the retrieval of data stored within the network. More specifically, operations S3.1 to S3.6 relate to retrieval of data that is stored locally on one of the storage devices. Operations S3.7 to S3.19 relate to retrieval of data that is either not stored locally at a particular one of the storage devices with which the user is interacting, has become corrupted at the particular storage device, or is otherwise not retrievable from the particular storage device.

As will be become apparent, as a result of the encryption process and the trust established over the network, if a particular user stores data using the network, only that particular user, or another user that the particular user has explicitly authorised to retrieve the data (beyond any reasonable doubt) is able to retrieve and decode that data.

In operation S3.1, a user request is received at a first user device UD1. The user request is a request to access the first data (e.g. a file or collection of files) stored on a first storage device SD1. For instance, the user may interact with their first user device UD1 to request that the first data be retrieved from storage.

In operation S3.2, an indication of this request is provided from the first user device UD1 to the first storage device SD1 over a local connection.

In operation S3.3, similarly to S2.3, responsive to the received indication, the first storage device SD1 may perform operations for authenticating the user. Such operations may include prompting the user to authenticate themselves using the authentication mechanism of the storage device SD1. The prompt may for instance be provided via a display or other output means of the storage device, or may be provided via the first user device UD1. Regardless of whether and how such a prompt is provided, the user may authenticate themselves to the first storage device SD1 using the authentication mechanism. In other examples, the user may authenticate themselves to first storage device SD1, via the first user device UD1. For instance, a pin or password may be provided by input means of the first user device UD1 and may then be forwarded to, and verified by, the first storage device SD1.

As will be appreciated, the authentication of S3.3 may ensure that only the user that originally instructed storage of the data, or another user that the particular user has explicitly authorised to retrieve the data, can access the data.

In operation S3.4, following successful authentication of the user, the first storage device retrieves the stored first data. Although not shown in FIG. 3, the first storage device SD1 may perform a determination as to whether the requested first data is retrievable at the first storage device. For instance, if it is determined that the requested first data is not retrievable (for instance, it is not locally stored or it is corrupted), the first storage device SD1 may perform operations such as those described with reference to S3.10 to S3.19, which are discussed below. If, on the other hand, it is determined that the requested data is retrievable, the data may be retrieved from the local memory of the first storage device, and may be decrypted.

Having decrypted the first data, the first storage device SD1, in operation S3.5, sends the decrypted first data to the first user device over the local connection.

In operation S3.6, the first user device then provides the first data to the requesting user. It can thus be seen that the first storage device may only return previously stored data to the user having authenticated the user locally at the first storage device.

Operations S3.7 to S3.19 relate to the retrieval of data that is not stored locally at a particular one of the storage devices with which the user is interacting or has become corrupted or is otherwise not retrievable from the particular storage device. As will of course be appreciated, although operations S3.7 to 3.19 are shown to result from a request for second data from the second storage device via the second user device, the operations may, in some examples, result from a request, provided to a different storage device, for retrieval of any data that is not stored at that storage device, as long as the requesting user is authorised to access that data, and the different storage device is also authorised. Such authorisation of the different storage devices is discussed below.

In operation S3.7, a user request is received at the second user device UD2. The user request is a request for to access second data (e.g. a file or collection of files) that is not stored on, or is not accessible on the second device SD2. For instance, the user may interact with the second user device UD2 to request retrieval of the second data.

In operation S3.8, an indication of this request is provided from the second user device UD2 to the first storage device SD2 over a local connection.

In operation S3.9, similarly to S3.3, responsive to the received indication, the second storage device SD2 may perform operations for authenticating the user. Such operations may include prompting the user to authenticate themselves using the authentication mechanism of the storage device SD2. The prompt may for instance be provided via a display or other output means of the storage device, or may be provided via the second user device UD2. Regardless of whether and how such a prompt is provided, the user may authenticate themselves to the second storage device SD2 using the authentication mechanism. In other examples, the user may authenticate themselves to the second storage device SD2, via the second user device UD2. For instance, a pin or password may be provided by input means of the second user device UD2 and may then be forwarded to, and verified by, the second storage device SD2. As will be appreciated, the authentication of S3.9 may ensure that only the user that originally instructed storage of the data, or another user that the particular user has explicitly authorised to retrieve the data, can access the data.

In operation S3.10, following successful authentication of the user, the second storage device performs operations for retrieving the second data. Although not shown in FIG. 3, the second storage device SD2 may perform a determination as to whether the requested data is retrievable at the second storage device. For instance, operations S3.11 to S3.19 may be performed only responsive to a determination that the requested data is not retrievable (for instance, it is not locally stored or it is corrupted) from the second storage device.

In operation S3.11, the second storage device SD2 generates a respective request to be sent to plural ones of the other storage devices amongst which the second data was previously distributed. Each of the requests may be signed with the cryptographic signature of the requesting device to identify the requesting storage device and verify the authenticity of the request.

Although not illustrated in FIG. 3, prior to generating the requests, the second storage device accesses a second record which associates the second data with other storage devices of the network to which cryptographically signed groups of one or more portions of the second data were previously sent. This second record or may be retrieved from some repository. The second record may be stored locally at the second storage device if, for instance, the second device originally stored the second data locally but it became corrupted. Alternatively, if the second storage device was authorised for use by an authorised user who originally stored the second data using a different storage device, records created by that different storage device may be made available to (e.g. may be transmitted to or made accessible to) the second storage device.

In operations S3.11 and S3.12, the cryptographically signed requests are sent to the plural ones of the other storage devices, via their respective user devices. In some examples, the other storage devices to which the requests are sent may be dependent on which storage devices of the network are currently connected to the network. For instance, the second storage device may send requests to "online" storage devices, which together store the group(s) of data portion(s) data required to allow the second data to be recreated. In some examples, requests may be sent to storage devices that are not "online". In such examples, an application running on the user device associated with the storage device that is not online may notify the user regarding an incoming communication (the user device may be unable to determine the nature of the communication) and/or prompt the user to connect the storage device to the user device. Once the storage device is connected via the local connection, the user device may forward the request to the storage device. In other examples, the user device may not notify the user but instead may store the incoming communication at the user device until such time as the storage device is connected over the local connection.

In operation S3.13, having received one of the requests transmitted by the second storage device in operations S3.11 and S3.12, the recipient device (in this case the first storage device SD1), authenticates the request as having originated from another storage device of the network of storage devices. The authentication utilises the cryptographic signature provided with the request. For instance, the authentication may be performed by comparing a) the cryptographic signature received with the original, previously received request to store the data and b) the cryptographic signature received with the request (of operation S3.11) to transmit that data.

In operation S3.14, having authenticated the request for the transmission of the group(s) of one or more portions of encrypted second data as having originated from another storage device of the network of storage devices, the requested data is transmitted back to the requesting storage device. As will be appreciated, the requested data is transmitted back to the requesting storage device, via the local connection to the first user device UD1, over the public network to the user device UD2 associated with the requesting storage device, and then over the local connection to the requesting storage device SD2.

Operations S3.15 and S3.16 are the same as S3.13 and S3.14 but are performed by a different storage device (and associated user device), in this case the third storage device SD3.

In operation S3.17, having received the requested data from the devices to which the requests were sent, the requesting storage device, in this case second storage device, reproduces the second data using the data received from the other storage devices. Specifically, it arranges the data of the plural groups of one or more portions of the second data and then decrypts the arranged data to reproduce the second data.

After reproducing the second data, in operation S3.18, the reproduced second data is then transferred by the second storage device to the second user device, via the local connection with the second user device. In operation S3.19, the reproduced second data is provided to the user via the second user device.

Although not discussed in any detail with reference to FIG. 3, it will be appreciated that the roles of the user devices may be similar to as described with reference to FIG. 2. For instance, the user devices may effectively act as conduits between the storage devices, without being able to understand or reproduce the encrypted data passed through the user devices.

Although not illustrated in FIG. 3, it will be appreciated that the content of the requests (i.e. those sent in S3.11 and S3.12) may be encrypted by the storage device which generates the request (in this case, the second storage device), prior to cryptographic signing and sending. In such examples, the storage device which receives the request decrypts the content of the request (e.g. once the source of the request has been verified/authenticated).

As noted above, operations S3.9 to S3.19 may, in some examples, result from a request for retrieval of data that is provided to a storage device other than that via which the data was originally stored. The storage device via which the data was originally stored may be referred to as the "original storage device". In some such examples, this other storage device may be referred to as an "authorised second storage device". Such an authorised second storage device may have been associated with the user (i.e. the user that instructed/requested storage of the requested data), while that user also possessed/was associated with the original storage device. Further, the authorised second storage device may have been authorised, using the original storage device, to access the stored data. Furthermore, as discussed above, the user requesting the data may be required to authenticate themselves (to the authorised second storage device e.g. using a password/passcode or biometric identification). In addition, in some examples, an additional code or mechanism (which was e.g. stored in or created using the original storage device) may also be required in order to allow the data to be retrieved via the authorised second storage device.

In some other examples, data may be retrieved using a "new storage device" which the particular user had not previously authorised to access data stored by the particular user. This may occur, for instance, when the original storage device is damaged or lost. Retrieval via such a new storage device many require a secret or secrets to be provided to the new device (e.g. via the input mechanism of the new device or, alternatively, over the local connection with the user device). This secret or secrets may identify the particular user who originally stored the data using original storage device. Once the new storage device has been configured, it may appear to the other storage devices in the network to be the original storage device with the same unique device identifier.

In order to configure a new storage device, the private key of the original device may be entered into the new device. This may be manually entered from a hard copy backup, or an electronic backup with a passphrase or PIN or the like. The new storage device may then reconnect to at least one other storage device in the group to obtain the group's public key and at least one IP address of another storage device in the group.

In some examples described herein, there may be a central database in which each of the storage devices stores the records created when data is split and distributed amongst the other storage devices in the network. The database may be accessed by "new storage devices", following authentication of the user and/or the new storage devices, thereby to allow such new devices to identify the storage devices from which to retrieve the requested data.

As will be appreciated, the users of the network may be able to interact with their storage devices via a number of different user devices. For instance, a request for the first storage device SD1 to store data locally (e.g. as in operations S2.1 and S2.2) may be provided via a different user device to that via which the request to retrieve the locally stored data (e.g. as in operations S3.1 and S3.2) is provided. For instance, the user may create and store a file using a first user device (e.g. a laptop), and may then request to view that file using a second device using a second user device (e.g. a tablet). Security may be ensured, even which allowing such functionality, by authenticating the user directly with storage device.

As will be appreciated, various operations discussed herein, particularly with reference to FIGS. 2 and 3 may be performed in a different order and/or concurrently with each other. Furthermore, if desired, one or more of the above-described operations may be optional or may be combined.

Similarly, it will be appreciated that, in some examples, the storage devices described above may omit certain aspects and/or functions. For instance, in some examples, one or more of the storage devices may omit an input mechanism and/or a display mechanism. Instead, such a device may instead use the input and/or display mechanism of the user device with which the storage device is locally connected. In other examples, the storage devices may connect to the network without using their respective user devices. In some such examples, the external connectors for connecting to user devices may be omitted. In other such examples, the storage devices may include the ability to connect to the network directly, but may also include the ability to connect with user devices. In those examples, some functions may be performed in connected mode (that is, while locally connected to a user device) while others are performed in in stand-alone mode (that is, not so connected).
Secure Communication Using the Network of Storage Devices Although not illustrated in the Figures, the network of storage devices may allow secure communications between users of the storage devices. For instance, each user device UD1, UD2, UD3 may include an application that is associated with the associated storage device SD1, SD2, SD3. Using the application on the user device, a user can create a message for sending to another user of the secure network. Having created the message and indicated the recipient of the message, who is another user of the secure network, the content of the message may be transferred over the local connection from the user device e.g. UD1 to the storage device e.g. SD1. At the storage device, the content is encrypted by the storage device and then cryptographically signed by the storage device using the identifier of the storage device. Such encryption and cryptographic signing may be similar to that described with reference to FIGS. 2 and 3, e.g. in operations S2.4 and S2.7. The encrypted and cryptographically signed message is then sent by the storage device over the local connection with the user device which then forwards the encrypted message towards the recipient storage device over the public or open network. In other examples, the content of the message may be created via direct user interaction with the storage device, e.g. using the input mechanism and display. It will be appreciated that users may be able to choose between creating the content via their user device or via direct interaction with the storage device.

When the message reaches the user device e.g. UD2 associated with the recipient storage device e.g. SD2, the application on the user device may notify the user regarding receipt of the message. However, neither the user device nor the user is able to view the message until the recipient storage device has been connected over a location with the user device associated with the recipient storage device. Once the local connection is formed, the message is transferred over the local connection to the recipient storage device. The recipient storage device then verifies the source of the message based on the cryptographic signature, e.g. similarly to operations S2.10, S2.12, S3.13 and S3.15. Once the source has been verified/authenticated, the storage device decrypts the message. The content of the message may be viewed/consumed using the display (or some other output means, e.g. audible output means) of the storage device or may be transferred the content over the local connection to the user device, where is can be consumed by the user. The recipient user can then respond to the message using the application on the user device or via direct interaction with the storage device.

As will of course be appreciated, the users are required to authenticate themselves directly with their storage device before the storage device will allow the communication of messages between the devices.
Examples of Encryption and Cryptographic Schemes The storage devices may utilise any suitable scheme for encrypting data, which may depend on the security requirements of the particular implementation of the network. One such example is the Advance Encryption Standard (AEC).

The cryptographic signing, which allows the storage devices of the network to identify each other and to authenticate received messages as coming from a legitimate source, may also be performed in any suitable manner, e.g. depending on the security requirements of the particular implementation. For instance, the devices may use PKI (public key infrastructure). As but one example, Elliptic Curve Cryptography may be used as the key sets, with Elliptic Curve Digital Signature Algorithm (ECDSA) for signing and Elliptic-curve Diffie-Hellman (ECDH) for sharing of keys.

As will of course be appreciated, the encryption and cryptographic signing schemes that are used may be updated as threats and best practices change.
Further Discussion of Components of Storage Devices Returning now to FIG. 4, the at least one processor may be of any suitable composition and may include one or more processors of any suitable type or suitable combination of types. Indeed, the term "processor" should be understood to encompass computers having differing architectures such as single/multi-processor architectures and sequencers/parallel architectures. For example, the at least one processor may be a programmable processor that interprets computer program instructions and processes data. The at least one processor may include plural programmable processors. Alternatively, the at least one processor may be, for example, programmable hardware with embedded firmware. The at least one processor may alternatively or additionally include one or more specialised circuit such as field programmable gate arrays FPGA, Application Specific Integrated Circuits (ASICs), signal processing devices etc. In some instances, the at least one processor may be referred to as processing apparatus, computing apparatus or processing means.

The at least one processor is coupled to the memory, which may or may not be part of the storage subsystem. For instance, in some examples, the at least one processor may have dedicated memory which may comprise a single memory unit or a plurality of memory units, upon which computer readable instructions (or code) that are executable by the at least one processor may be stored. In examples, the at least one processor and dedicated memory may be part of a microcontroller.

The computer readable instructions may provide the logic and routines that enables the storage devices SD1, SD2, SD3 to perform the functionality described above. The combination of computer-readable instructions stored on memory (of any of the types described above) may be referred to as a computer program product. In general, references to computer programs, instructions, code etc. should be understood to express software for a programmable processor firmware such as the programmable content of a hardware device as instructions for a processor or configured or configuration settings for a fixed function device, gate array, programmable logic device, etc.

The memory in the storage subsystem (and the memory dedicated to the at least one processor, if appropriate) may any suitable type of memory. Such memory types may include both volatile memory and non-volatile memory. In such examples, the computer readable instructions/program code may be stored in the non-volatile memory and may be executed by the at least one processor using the volatile memory for temporary storage of data or data and instructions. Examples of volatile memory include random-access memory (RAM), dynamic random-access memory (DRAM), and synchronous dynamic random-access memory (SDRAM) etc. Examples of non-volatile memory include read-only memory (ROM), programmable read-only memory (PROM), electronically erasable programmable read-only memory (EEPROM), flash memory, optical storage, magnetic storage, etc.

The memory 902, 1002 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 7 and 8 are examples only and that various operations depicted therein may be omitted, reordered and/or combined.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while various examples are described above, these descriptions should not be viewed in a limiting sense. Rather, there are several variations and modifications which may be made without departing from the scope of the present invention as defined in the appended claims.

The specification can be best understood with reference to the following Numbered Paragraphs:

Numbered Paragraph 1. A first storage device for encrypting and storing data, comprising:

a mechanism or system for authenticating a user via user interaction directly with the first storage device;

a mechanism for connecting over a local connection with one or more user devices; and computer-readable memory for storing electronic data on the first storage device;

wherein the first storage device is configured to:

receive, over the local connection and from a first of the one or more user devices, first data for storage at the first storage device;

encrypt the first data and store the encrypted first data locally in the computer-readable memory of the first storage device;

split the encrypted first data into multiple portions;

apply a cryptographic signature to each of plural groups of one or more of the portions, the cryptographic signature enabling the first storage device to be identified and authenticated by other storage devices of a network of storage devices;

send each of the cryptographically signed groups to a respective other storage device of the network of storage devices; and create a first record which associates the first data with the other storage devices of the network to which the cryptographically signed groups of were sent;

wherein the first storage device is further configured to, responsive to a request to access the first data, the request to access the first data resulting from a user request to access the first data provided to a user device and received at the first storage device via a local connection with the user device:

retrieve the encrypted first data from the computer-readable memory, decrypt the encrypted first data, and send, over the local connection with the user device to which the user request to access the first data was provided, the decrypted first data; and wherein the first storage device is further is configured to:

receive a request for transmission of previously-received, cryptographically signed second data, authenticate the request for the transmission of the previously-received, cryptographically signed second data as having originated from another storage device of the network of storage devices, and having authenticated the request for the transmission of the previously-received, cryptographically signed second data as having originated from another storage device of the network of storage devices, send the previously-received, cryptographically signed second data to the other storage device of the network of storage devices.

Numbered Paragraph 2. The first storage device of Numbered Paragraph 1, wherein the storage device is further configured to:

responsive to receipt of a request to access third data, the request to access the third data resulting from a user request to access the third data provided to a user device and received at the first storage device via a local connection with the user device:

determine that the third data is not retrievable from the first storage device;

access a second record which associates the third data with other storage devices of the network to which one or more portions of the third data were previously sent;

generate a respective request to be sent to plural ones of the other storage devices identified in the second record, each of the requests being for requesting that the one or more portions of the third data, that were previously sent to the storage device for which the request is intended, be transmitted to the first storage device, sign each request with the cryptographic signature of the first storage device to identify the first storage device and verify the authenticity of the request send the cryptographically signed requests to the plural ones of the other storage devices.

Numbered Paragraph 3. The first storage device of Numbered Paragraph 2, wherein the first storage device is further configured to:

receive plural groups of one or more portions of the third data from the plural ones of the other storage devices;

arrange the data of the plural groups of one or more portions of the third data and decrypt the arranged data to reproduce the third data, and transfer, to the user device to which the user request to access the third data was provided and via the local connection with the user device to which the user request to access the third data was provided, the reproduced third data.

Numbered Paragraph 4. The first storage device of Numbered Paragraph 2 or Numbered Paragraph 3, wherein determining that the third data is not retrievable from the first storage device comprises determining that a copy of the third data previously-stored locally on the first storage device is corrupted.

Numbered Paragraph 5. The first storage device of Numbered Paragraph 2 or Numbered Paragraph 3, wherein the third data was never locally stored on the first storage device.

Numbered Paragraph 6. The first storage device of any preceding Numbered Paragraph, wherein the request for transmission of previously-received, cryptographically signed second data is authenticated using a cryptographic signature received with the request for the transmission of a previously-received, cryptographically signed second data.

Numbered Paragraph 7. The first storage device of any preceding Numbered Paragraph, wherein the first storage device is configured to communicate with the other storage devices of the network via a combination of a local connection with a currently connected user device and a connection of the currently connected user device with a communications network.

Numbered Paragraph 8. The first storage device of any preceding Numbered Paragraph, wherein the first storage device is a portable storage device.

Numbered Paragraph 9. The first storage device of any preceding Numbered Paragraph, wherein the mechanism for authenticating a user via user interaction directly with the first storage device comprises a group of buttons or other mechanical, electronic or electromagnetic switches permitting user input.

Numbered Paragraph 10. The first storage device of any preceding Numbered Paragraph, wherein the mechanism for authenticating a user via user interaction directly with the first storage device comprises a biometric reader.

Numbered Paragraph 11. The first storage device of any preceding Numbered Paragraph, wherein the first storage device is configured to encrypt the first data and store the encrypted first data locally in the computer-readable memory of the first storage device responsive to a successful authentication of the user via user interaction directly with the first storage device.

Numbered Paragraph 12. The first storage device of any preceding Numbered Paragraph, wherein the first storage device is configured to retrieve the encrypted first data from the computer-readable memory, decrypt the encrypted first data, and send the decrypted first data over the local connection responsive to a successful authentication of the user via user interaction directly with the first storage device.

Numbered Paragraph 13. The first storage device of any preceding Numbered Paragraph, wherein the first storage device is configured to send the cryptographically signed requests to the plural ones of the other storage devices responsive to a successful authentication of the user via user interaction directly with the first storage device.

Numbered Paragraph 14. The first storage device of any preceding Numbered Paragraph, wherein the first storage device is configured so as not to respond to any user-derived requests unless the user has been successful authenticated via user interaction directly with the first storage device.

Numbered Paragraph 15. The first storage device of any preceding Numbered Paragraph, further comprising an anti-tamper system to detect physical or electrical tampering with the device and to respond by rendering cryptographic keys, which are stored at the first storage device and are for use in decrypting data also stored on the first storage device, unusable.

Numbered Paragraph 16. The first storage device of any preceding Numbered Paragraph, wherein each of the storage devices of the network of storage devices is of a same type as the first storage device.

Numbered Paragraph 17. The first storage device of any preceding Numbered Paragraph, wherein each of the storage devices of the network of storage devices is a portable storage device.

Numbered Paragraph 18. The first storage device of any preceding Numbered Paragraph, wherein each of the storage devices of the network of storage devices comprises:

a mechanism or system for authenticating a user via user interaction directly with the storage device;

a mechanism for connecting over a local connection with one or more user devices;

computer-readable memory for storing electronic data on the storage device; and at least one processor configured to encrypt data prior to storage and/or transmission.

Numbered Paragraph 19. The first storage device of any preceding Numbered Paragraph, further comprising a display for presenting information to the user.

The invention claimed is:

1. A first storage device for encrypting and storing data, comprising:

a mechanism or system for authenticating a user via user interaction directly with the first storage device;

a mechanism for connecting over a local connection with one or more user devices; and computer-readable memory for storing electronic data on the first storage device;

wherein the first storage device is configured to:

receive, over the local connection and from a first of the one or more user devices, first data for storage at the first storage device;

encrypt the first data and store the encrypted first data locally in the computer-readable memory of the first storage device;

split the encrypted first data into multiple portions;

apply a cryptographic signature to each of plural groups of one or more of the portions, the cryptographic signature enabling the first storage device to be identified and authenticated by other storage devices of a network of storage devices;

send each of the cryptographically signed groups to a respective other storage device of the network of storage devices; and create a first record which associates the first data with the other storage devices of the network to which the cryptographically signed groups of were sent;

wherein the first storage device is further configured to, responsive to a request to access the first data, the request to access the first data resulting from a user request to access the first data provided to a user device and received at the first storage device via a local connection with the user device:

retrieve the encrypted first data from the computer-readable memory, decrypt the encrypted first data, and send, over the local connection with the user device to which the user request to access the first data was provided, the decrypted first data; and wherein the first storage device is further is configured to:

receive a request for transmission of previously-received, cryptographically signed second data, authenticate the request for the transmission of the previously-received, cryptographically signed second data as having originated from another storage device of the network of storage devices, and having authenticated the request for the transmission of the previously-received, cryptographically signed second data as having originated from another storage device of the network of storage devices, send the previously-received, cryptographically signed second data to the other storage device of the network of storage devices.

2. The first storage device of claim 1, wherein the storage device is further configured to:

responsive to receipt of a request to access third data, the request to access the third data resulting from a user request to access the third data provided to a user device and received at the first storage device via a local connection with the user device:

determine that the third data is not retrievable from the first storage device;

access a second record which associates the third data with other storage devices of the network to which one or more portions of the third data were previously sent;

generate a respective request to be sent to plural ones of the other storage devices identified in the second record, each of the requests being for requesting that the one or more portions of the third data, that were previously sent to the storage device for which the request is intended, be transmitted to the first storage device, sign each request with the cryptographic signature of the first storage device to identify the first storage device and verify the authenticity of the request send the cryptographically signed requests to the plural ones of the other storage devices.

3. The first storage device of claim 2, wherein the first storage device is further configured to:

receive plural groups of one or more portions of the third data from the plural ones of the other storage devices;

arrange the data of the plural groups of one or more portions of the third data and decrypt the arranged data to reproduce the third data, and transfer, to the user device to which the user request to access the third data was provided and via the local connection with the user device to which the user request to access the third data was provided, the reproduced third data.

4. The first storage device of claim 2, wherein determining that the third data is not retrievable from the first storage device comprises determining that a copy of the third data previously-stored locally on the first storage device is corrupted.

5. The first storage device of claim 2, wherein the third data was never locally stored on the first storage device.

6. The first storage device of claim 1, wherein the request for transmission of previously-received, cryptographically signed second data is authenticated using a cryptographic signature received with the request for the transmission of a previously-received, cryptographically signed second data.

7. The first storage device of claim 1, wherein the first storage device is configured to communicate with the other storage devices of the network via a combination of a local connection with a currently connected user device and a connection of the currently connected user device with a communications network.

8. The first storage device of claim 1, wherein the first storage device is a portable storage device.

9. The first storage device of claim 1, wherein the mechanism for authenticating a user via user interaction directly with the first storage device comprises a group of buttons or other mechanical, electronic or electromagnetic switches permitting user input.

10. The first storage device of claim 1, wherein the mechanism for authenticating a user via user interaction directly with the first storage device comprises a biometric reader.

11. The first storage device of claim 1, wherein the first storage device is configured to encrypt the first data and store the encrypted first data locally in the computer-readable memory of the first storage device responsive to a successful authentication of the user via user interaction directly with the first storage device.

12. The first storage device of claim 1, wherein the first storage device is configured to retrieve the encrypted first data from the computer-readable memory, decrypt the encrypted first data, and send the decrypted first data over the local connection responsive to a successful authentication of the user via user interaction directly with the first storage device.

13. The first storage device of claim 1, wherein the first storage device is configured to send the cryptographically signed requests to the plural ones of the other storage devices responsive to a successful authentication of the user via user interaction directly with the first storage device.

14. The first storage device of claim 1, wherein the first storage device is configured so as not to respond to any user-derived requests unless the user has been successful authenticated via user interaction directly with the first storage device.

15. The first storage device of claim 1, further comprising an anti-tamper system to detect physical or electrical tampering with the device and to respond by rendering cryptographic keys, which are stored at the first storage device and are for use in decrypting data also stored on the first storage device, unusable.

16. The first storage device of claim 1, wherein each of the storage devices of the network of storage devices is of a same type as the first storage device.

17. The first storage device of claim 1, wherein each of the storage devices of the network of storage devices is a portable storage device.

18. The first storage device of claim 1, wherein each of the storage devices of the network of storage devices comprises:

a mechanism or system for authenticating a user via user interaction directly with the storage device;

a mechanism for connecting over a local connection with one or more user devices;

computer-readable memory for storing electronic data on the storage device; and at least one processor configured to encrypt data prior to storage and/or transmission.

19. The first storage device of claim 1, further comprising a display for presenting information to the user.

* * * * *